United States Patent
He et al.

(10) Patent No.: US 10,459,517 B2
(45) Date of Patent: Oct. 29, 2019

(54) SYSTEM AND METHODS FOR SCHEDULING SOFTWARE TASKS BASED ON CENTRAL PROCESSING UNIT POWER CHARACTERISTICS

(71) Applicant: QUALCOMM Incorporated, San Diego, CA (US)

(72) Inventors: Rong He, San Diego, CA (US); Debashis Dutt, San Jose, CA (US); Orhan Akyildiz, San Diego, CA (US); Sunit Bhatia, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 15/689,090

(22) Filed: Aug. 29, 2017

(65) Prior Publication Data
US 2018/0284869 A1 Oct. 4, 2018

Related U.S. Application Data

(60) Provisional application No. 62/480,092, filed on Mar. 31, 2017.

(51) Int. Cl.
*G06F 1/3293* (2019.01)
*H04W 52/02* (2009.01)
(Continued)

(52) U.S. Cl.
CPC ............ *G06F 1/329* (2013.01); *G06F 1/206* (2013.01); *G06F 1/3203* (2013.01);
(Continued)

(58) Field of Classification Search
None
See application file for complete search history.

(56) References Cited

U.S. PATENT DOCUMENTS 8,381,004 B2 * 2/2013 Elnozahy .............. G06F 1/3203
713/321
8,819,686 B2 * 8/2014 Memik .................. G06F 1/206
718/102

(Continued)

FOREIGN PATENT DOCUMENTS

WO 2016209494 A1 12/2016

OTHER PUBLICATIONS

International Search Report and Written Opinion—PCT/US2018/016091—ISA/EPO—dated May 8, 2018.

*Primary Examiner* — Isaac T Tecklu
(74) *Attorney, Agent, or Firm* — The Marbury Law Group/Qualcomm

(57) ABSTRACT

Methods and devices for scheduling processing tasks in a computing device configured with a group of low-power processor cores and at least one high-performance processor core may include identifying multiple application streams related to communication with a wireless local area network (WLAN), computing a total WLAN throughput requirement for the application streams, and determining whether the total WLAN throughput requirement is less than a first threshold value. The first threshold value may be based on power characteristics of the low-power processor cores. In response to determining that the total WLAN throughput requirement is less than the first threshold value, the computing device may schedule all processing tasks for the multiple application streams on one of the low-power processor cores.

24 Claims, 10 Drawing Sheets

(51) Int. Cl.
  *G06F 1/329* (2019.01)
  *G06F 1/3203* (2019.01)
  *H04L 29/08* (2006.01)
  *G06F 1/20* (2006.01)
  *G06F 1/3206* (2019.01)
  *G06F 9/48* (2006.01)
  *G06F 9/50* (2006.01)

(52) U.S. Cl.
  CPC .......... *G06F 1/3206* (2013.01); *G06F 1/3293* (2013.01); *H04L 67/1008* (2013.01); *H04L 67/1029* (2013.01); *H04W 52/028* (2013.01); *G06F 9/4893* (2013.01); *G06F 9/5094* (2013.01); *H04L 67/16* (2013.01); *Y02D 10/22* (2018.01); *Y02D 10/24* (2018.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/144* (2018.01); *Y02D 70/162* (2018.01)

(56) References Cited

U.S. PATENT DOCUMENTS

| | | | | |
|---|---|---|---|---|
| 9,161,361 B2* | 10/2015 | Gormley | .......... | H04W 72/0473 |
| 9,426,783 B2* | 8/2016 | Gleixner | .......... | H04W 4/70 |
| 9,591,582 B1* | 3/2017 | Rabii | .......... | H04W 52/028 |
| 9,619,284 B2 | 4/2017 | Sakarda | .......... | G06F 9/3885 |
| 9,710,309 B2* | 7/2017 | Davis | .......... | G06F 9/5044 |
| 9,747,139 B1* | 8/2017 | Borlick | .......... | G06F 9/5094 |
| 9,918,264 B1* | 3/2018 | Bitra | .......... | H04W 4/02 |
| 2007/0211280 A1* | 9/2007 | Bansal | .......... | G06F 9/50 358/1.15 |
| 2009/0172423 A1* | 7/2009 | Song | .......... | G06F 1/3203 713/300 |
| 2009/0222654 A1* | 9/2009 | Hum | .......... | G06F 1/3203 713/100 |
| 2009/0296574 A1* | 12/2009 | Liao | .......... | H04W 52/343 370/230 |
| 2009/0300623 A1* | 12/2009 | Bansal | .......... | G06F 9/5066 718/102 |
| 2009/0328047 A1* | 12/2009 | Li | .......... | G06F 9/5033 718/102 |
| 2010/0332876 A1* | 12/2010 | Fields, Jr. | .......... | G06F 1/3203 713/323 |
| 2011/0173478 A1* | 7/2011 | Li | .......... | G06F 1/3203 713/324 |
| 2011/0246999 A1* | 10/2011 | Bansal | .......... | G06F 9/50 718/103 |
| 2012/0317568 A1* | 12/2012 | Aasheim | .......... | G06F 9/45558 718/1 |
| 2013/0007490 A1* | 1/2013 | Yamashita | .......... | G06F 1/3203 713/320 |
| 2013/0132972 A1 | 5/2013 | Sur et al. | | |
| 2014/0007134 A1* | 1/2014 | Fletcher | .......... | G06F 9/54 718/106 |
| 2014/0026146 A1* | 1/2014 | Jahagirdar | .......... | G06F 9/4856 718/105 |
| 2014/0173311 A1* | 6/2014 | Park | .......... | G06F 1/206 713/320 |
| 2014/0181501 A1* | 6/2014 | Hicok | .......... | G06F 9/5094 713/100 |
| 2014/0196050 A1* | 7/2014 | Yu | .......... | G06F 9/5088 718/104 |
| 2015/0012765 A1* | 1/2015 | Hum | .......... | G06F 1/3203 713/320 |
| 2015/0121105 A1* | 4/2015 | Ahn | .......... | G06F 1/324 713/322 |
| 2015/0178138 A1 | 6/2015 | Saha et al. | | |
| 2015/0301573 A1* | 10/2015 | Venkumahanti | .......... | G06F 1/3206 713/323 |
| 2015/0346800 A1* | 12/2015 | Kumar | .......... | G06F 1/3206 713/323 |
| 2015/0355700 A1* | 12/2015 | Pusukuri | .......... | G06F 1/329 713/323 |
| 2016/0011648 A1* | 1/2016 | Zhang | .......... | H04L 43/0817 713/323 |
| 2016/0026507 A1* | 1/2016 | Muckle | .......... | G06F 9/5094 718/104 |
| 2016/0092274 A1* | 3/2016 | Singh | .......... | G06F 9/5027 718/104 |
| 2016/0203023 A1* | 7/2016 | Mitran | .......... | G06F 9/5011 718/104 |
| 2017/0134487 A1* | 5/2017 | Karandikar | .......... | H04L 67/1002 |
| 2017/0286142 A1* | 10/2017 | Palermo | .......... | G06F 9/45558 |
| 2018/0027055 A1* | 1/2018 | Balle | .......... | G06F 3/0613 709/226 |
| 2018/0081854 A1* | 3/2018 | Joy | .......... | G06F 15/17331 |
| 2018/0150333 A1* | 5/2018 | Alapati | .......... | G06F 9/4881 |
| 2018/0232321 A1* | 8/2018 | Akyildiz | .......... | G06F 9/4893 |
| 2018/0365067 A1* | 12/2018 | Zeng | .......... | G06F 9/5044 |

* cited by examiner

SYSTEM AND METHODS FOR SCHEDULING SOFTWARE TASKS BASED ON CENTRAL PROCESSING UNIT POWER CHARACTERISTICS

RELATED APPLICATIONS

This application claims the benefit of priority to U.S. Provisional Application No. 62/480,092 entitled "System and Methods for Scheduling Software Tasks based on Central Processing Unit Power Characteristics" filed Mar. 31, 2017, the entire contents of which are hereby incorporated by reference for all purposes.

BACKGROUND

The increasing demand for performance and features in a broad array of computing devices has led manufactures to include multiple central processor units (CPUs) in computing devices to handle a greater number of capabilities and heavier workloads while executing faster than previous generations. Some architectures include CPUs arranged into clusters for executing different tasks and supporting different capabilities. A computing device may include a multi-cluster CPU system to handle the demands of the software and subsystems of the computing device. In some designs, multiple processing cores (e.g., 2, 4, 8 or more) may be included within a single processor device, which may be referred to as a multi-core processor or multi-core CPU.

A computing device may be configured with applications that send and/or receive wireless data, for example, over a WLANs connection. Such connections are enabled through various software and hardware interactions on the device. Specifically, a CPU may execute tasks including a user-initiated application, a transmission control protocol (TCP)/internet protocol (IP) stack, and a wireless local area network (WLAN) driver that interfaces with a WLAN interface (e.g., network card, network interface controller, etc.). In a multi-core CPU, these software tasks are typically scheduled on cores based on ensuring peak throughput, without accounting for how the CPU cores are utilized. However, such scheduling of the WLAN driver and TCP/IP stack software can have a large impact on overall CPU power. As a result, significant power may be used to support WLAN applications on the computing device, which can quickly consume battery life on portable computing devices (e.g., smartphones, tablets, etc.). Further, overall performance of the computing device may be compromised by such power use, for example, due to a thermal shutdown triggered when power is too high and heat cannot dissipate quickly enough.

SUMMARY

Various embodiments provide devices and methods for scheduling processing tasks in a computing device having a plurality of processing cores, which may include group of low-power processor cores and/or high-performance processor core(s). Various embodiments may include identifying multiple application streams related to communications with a wireless local area network (WLAN), computing a total WLAN throughput requirement for the multiple application streams, determining whether the total WLAN throughput requirement is less than a first threshold value, and scheduling all processing tasks for the multiple application streams on one of the low-power processor cores in response to determining that the total WLAN throughput requirement is less than a first threshold value. In some embodiments, the first threshold value may be based on power characteristics of the low-power processor cores.

Some embodiments may further include determining whether the total WLAN throughput requirement is less than a second threshold value in response to determining that the total WLAN throughput requirement is not less than the first threshold value. In some embodiments, the second threshold value may correspond to a change in a power profile curve measuring power consumption as a function of workload for the low-power processor cores.

Some embodiments may further include scheduling all processing tasks for the multiple application streams on at least one of the low-power processor cores in response to determining that the total WLAN throughput requirement is less than the second threshold value.

Some embodiments may further include scheduling processing tasks for the multiple application streams by distributing the tasks across all of the low-power processor cores in response to determining that the total WLAN throughput requirement is not less than the second threshold value.

In some embodiments, distributing the tasks across all of the low-power processor cores may reduce an average frequency among the low-power processor cores. In some embodiments, reducing the average frequency among the low-power processor cores may provide a power advantage based on a slower rate of increase in performance than power consumption.

In some embodiments, the processing tasks for the multiple application streams may include at least WLAN driver software and internet protocol (IP) stack software. In some embodiments, a performance core may be turned off during the scheduling. In some implementations and situations, the entire performance cluster of cores may be turned off during the scheduling.

Various embodiments may include a computing device having a processing device having plurality of processing cores, which may include a group of low-power processor cores and/or high-performance processor core(s), and configured with processor-executable instructions to perform operations of any of the methods summarized above. Various embodiments may include a computing device having means for performing functions of any of the methods summarized above. Various embodiments may include a non-transitory processor-readable medium having stored thereon processor-executable instructions configured to cause a processing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
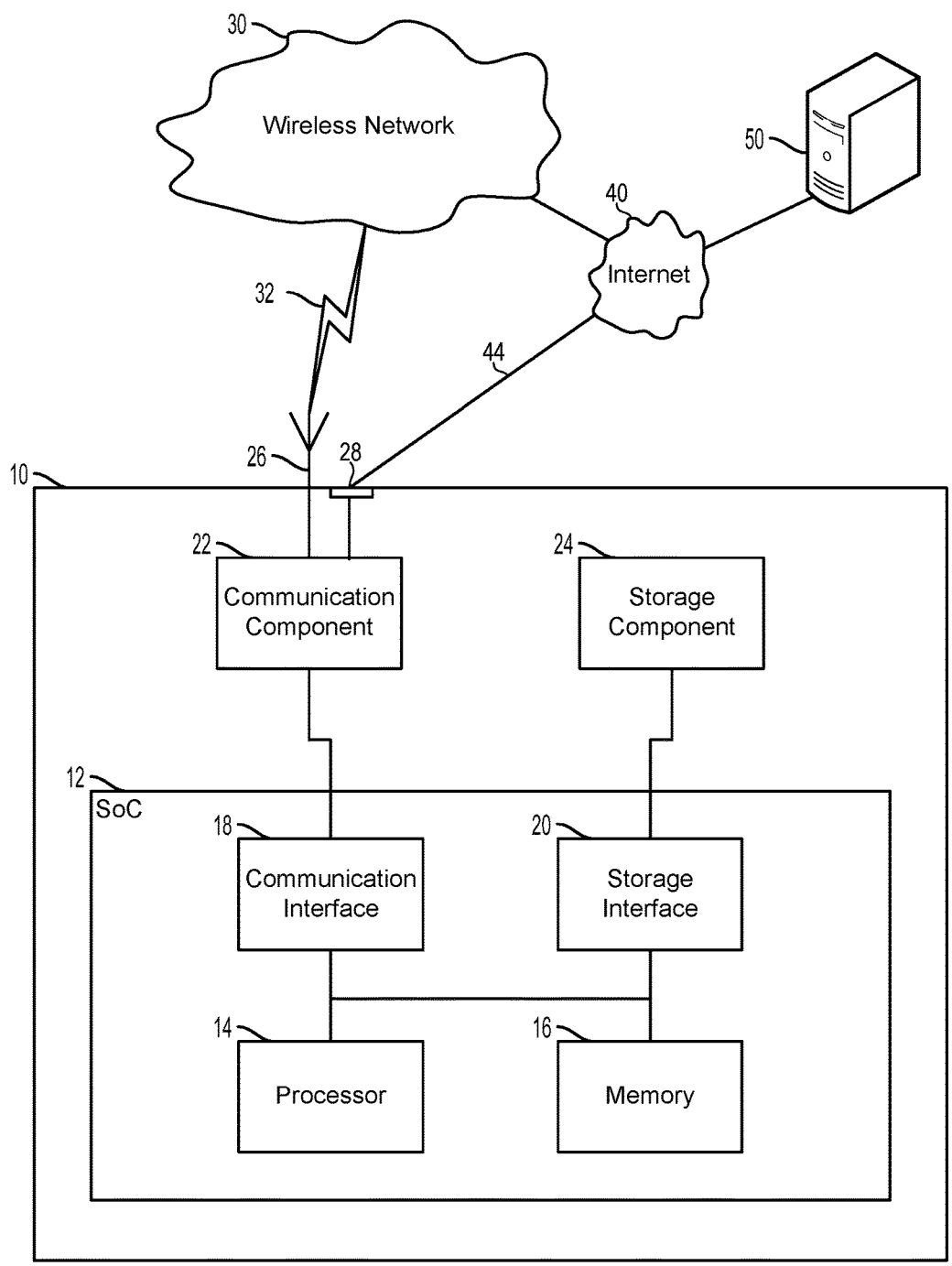
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and systems and devices implementing such methods for dynamically scheduling WLAN software tasks based on power characteristics of the particular CPU (i.e., application CPU). In various embodiments, a WLAN subsystem may periodically monitor the throughput and number of application streams initiated by the user, and may schedule certain WLAN tasks (e.g., IP stack and driver software) on cores of the application processor to minimize power usage based on the throughput and application streams.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

As used herein, the term "application" may include files having executable content, such as: object code, scripts, byte code, markup language files, and patches. In addition, an "application" referred to herein, may also include files that are not executable in nature, such as documents that may need to be opened or other data files that need to be accessed.

The terms "workload," "process load," "process workload" and "block of code" are used interchangeably and generally directed toward the processing burden, or percentage of processing burden, that is associated with, or may be assigned to, a given processing component in a given embodiment. The term "DMIPS" represents the number of Dhrystone iterations required to process a given number of millions of instructions per second (MIPS) (i.e., Dhrystone MIPS (DMIPS)). In this description, the DMIPS term is used as a general unit of measure to indicate relative levels of processor performance in the exemplary embodiments, and should not be construed to suggest that any given embodiment falling within the scope of the claims must, or must not, include a processor having any specific Dhrystone rating.

The terms "processing device," "system-on-chip" (SoC) and "integrated circuit" are used interchangeably herein to refer to a set of interconnected electronic circuits typically, but not exclusively, including multiple hardware cores, a memory, and a communication interface. The hardware cores may be of a variety of different types of processors, such as a general purpose multi-core processor, a multi-core application processor/central processing unit (CPU)), a multi-core digital signal processor (DSP), a multi-core graphics processing unit (GPU), a multi-core accelerated processing unit (APU), and a multi-core auxiliary processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon. Such a configuration may also be referred to as the integrated circuit (IC) components being on a single chip.

FIG. 1 illustrates an example of a computing device 10 suitable for use with the various embodiments. The computing device 10 that may include a processing device in the form of an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 for connecting to a wired connection 44 to the Internet 40. The computing device 10 may communicate with a remote computing device 50 over the wireless connection 32 and/or the wired connection 44. The processor 14 may include any of a variety of processing devices, for example, a number of processor cores.

The SoC 12 may include one or more processor 14. The computing device 10 may include one or more SoC 12, thereby increasing the number of processors 14 and processor cores. The computing device 10 may also include processors 14 that are not associated with a SoC 12. The processors 14 may each be configured for specific purposes that may be the same or different from other processors 14 of the computing device 10. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processor cores may be referred to as a multi-core cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The communication interface 18, communication component 22, antenna 26 and/or network interface 28, may work in unison to enable the computing device 10 to communicate over a wireless network 30 via a wireless connection 32, and/or a wired connection 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

While the processing device is illustrated as an SoC 12 in FIG. 1, the processing device may be in different forms, such as a chipset, a printed circuit board with multiple, chips, a multi-processor core, etc. Further, some or all of the components of the computing device 10 may be differently arranged and/or combined while still serving the necessary functions. Moreover, the computing device 10 may not be limited to one of each of the components, and multiple instances of each component, in various configurations, may be included in the computing device 10.

Figure 2:
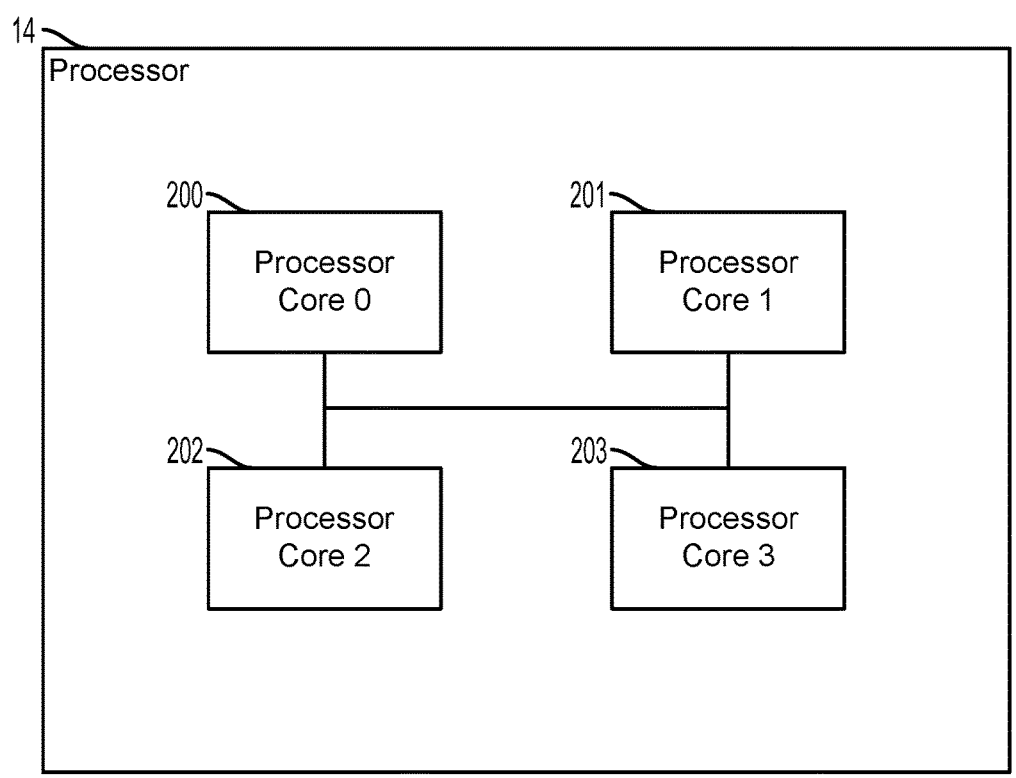
FIG. 2 is a component block diagram illustrating an example multi-core processor suitable for implementing an embodiment.

FIG. 2 illustrates a processing device in the form of a multi-core processor 14 suitable for implementing an embodiment. The multi-core processor 14, such as an application CPU, may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the processor 14 may individually or in combination include fewer or more than the four processor cores 200, 201, 202, 203 illustrated and described herein.

Figure 3A:
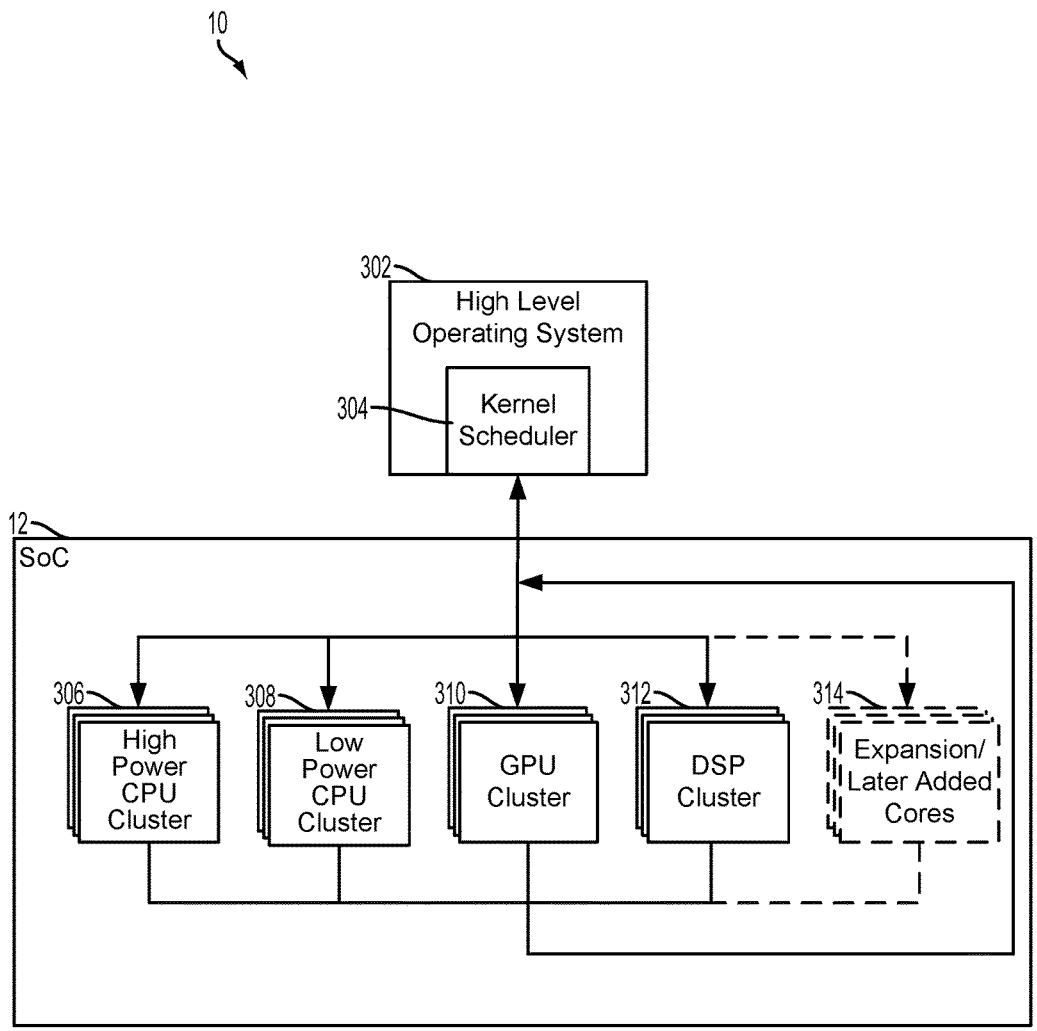
FIG. 3A is a functional and component block diagram of a system-on-chip suitable for implementing an embodiment.

FIG. 3A illustrates a computing device 10 having a processing device in the form of a SoC 12 including multiple groups of processor cores suitable for implementing various embodiments. With respect to FIGS. 1-3A, the multiple groups of processor cores may be arranged in multi-core clusters 306, 308, 310, 312, 314. The computing device 10 may also include a high level operating system 302, which may be configured to communicate with the components of the SoC 12 and operate a kernel scheduler 304 for managing the processes or tasks assigned to the various processor cores. In various embodiments, the kernel scheduler 304 may be a part of or separate from the high level operating system 302.

Different types of multi-core clusters illustrated in FIG. 3 may be further grouped as being part of different processors or processing units. For example, the SoC 12 may incorporate an application CPU that includes a high performance multi-core cluster ("high power CPU cluster") 306 and low performance multi-core cluster ("low power CPU cluster") 308. The SoC 12 may also have a multi-core graphics processing unit (GPU) and a multi-core digital signal processor (DSP) each with at least one multi-core cluster. For example, the SoC may include a GPU cluster 310 and a DSP cluster, as well as other processor cores and/or multi-core clusters 314.

FIG. 3A also illustrates that processor cores 314 may be installed in the computing device after it is sold, such as an expansion or enhancement of processing capability or as an update to the computing device. After-market expansions of processing capabilities are not limited to central processor cores, and may be any type of computing module that may be added to or replaced in a computing system, including for example, additional, upgraded or replacement modem processors, additional or replacement graphics processors (GPUs), additional or replacement audio processors, and additional or replacement DSPs, any of which may be installed as single-chip-multi-core modules or clusters of processors (e.g., on a SoC). Also, in servers, such added or replaced processor components may be installed as processing modules (or blades) that plug into a receptacle and wiring harness interface.

Each of the groups of processor cores illustrated in FIG. 3 may be part of a multi-core processor 14 as described above. Moreover, the five example multi-core clusters are not meant to be limiting, and the computing device 10 or the SoC 12 may individually or in combination include fewer or more than the five multi-core clusters 306, 308, 310, 312, 314 (or groups of processors), including types not displayed in FIG. 3A.

As described, a multi-core processor (e.g., an application CPU) may implement a heterogeneous processor architecture such as big.LITTLE. The big.LITTLE technology takes advantage of the dynamic usage pattern for smartphones and tablets, and seeks to use low-power processor cores (e.g., in the power cluster) for most of the operations in the device.

Recent developments in big.LITTLE architecture models include providing heterogeneous multi-processing (HMP), which allows all cores to be active and exposed to the operating system. Tasks that are of a high priority or that require computational intensity can be allocated to the performance cores while threads with less priority or less computational intensity, such as background tasks, can be performed by the power cores.

Global task scheduling is a scheduling model that may be employed to allocate tasks to various processing cores on a big.LITTLE SoC. Specifically, a scheduler using global task scheduling is aware of the differences in compute capability capacity between performance cores and power cores. Using statistical data and other heuristics, the scheduler tracks the performance requirement for each individual task, and uses that information to decide which type of processor core to use for each. Unused cores can be powered off, and if all processor cores in a cluster are off, the cluster itself can be powered off.

Figure 3B:
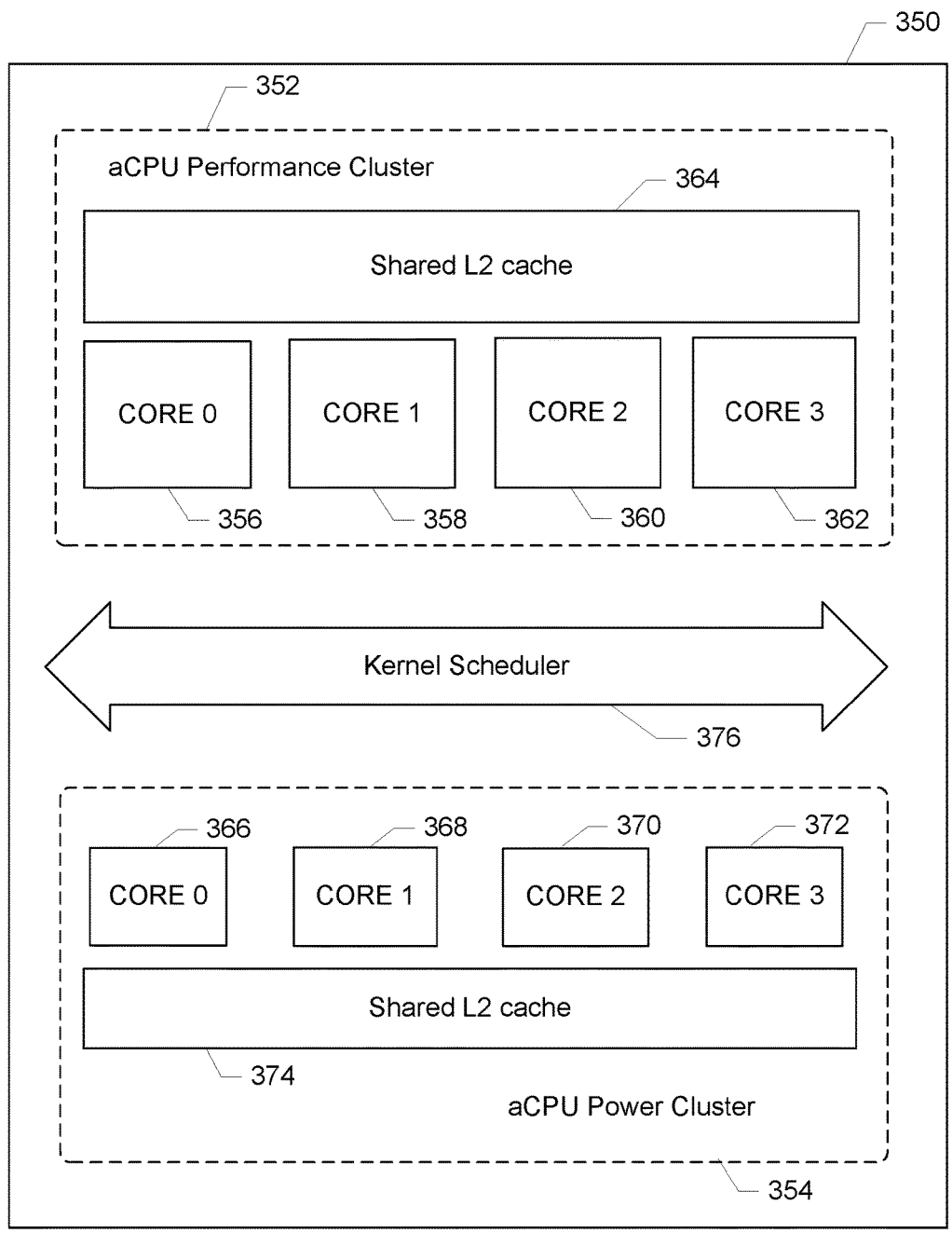
FIG. 3B is a functional and component block diagram of multi-core clusters and related processes according to various embodiments.

FIG. 3B illustrates an example of a big.LITTLE SoC 350 of a processing device such as an application CPU ("aCPU"). With reference to FIGS. 1-3B, the SoC 350 may include at least one performance cluster 352 and at least one power cluster 354. The performance cluster 352 may include four processing cores 356, 358, 360, 362, also referred to as "performance cores," and a shared L2 cache 364. The power cluster 354 may include four processing cores 366, 368, 370, 372, also referred to as "power cores," and a shared L2 cache 374. In some embodiments, a global task scheduling model may be implemented by the kernel scheduler 376 on the application CPU.

Power characteristics of the power cluster and of a performance cluster of a multi-core application CPU may be evaluated by measuring power usage (mW) as a function of a performance level (e.g., in millions of instructions per second (MIPS)) or performance benchmark (e.g., in Dhrystone MIPS (DMIPS), CoreMark, etc.). At a given performance level, the cores of the power cluster may consume less power than the cores of the performance cluster. That is, the power cluster may deliver better performance per mW than the performance cluster. However, the power cluster may also have a maximum performance level based on a highest clock rate/frequency supported by the hardware. Therefore, tasks that demand performance above the maximum level of the power cluster are typically carrier out by the performance cluster, which enables much higher performance levels but at lower efficiency (i.e., lower performance gain per mW). That is, executing tasks on the performance cluster may allow high processing demand tasks with the trade-off of significantly increase power.

Various applications that may be run on a computing device can have uniquely high processing demands, such as those relating to gaming, video playback or editing, etc. However, even without such applications, activities that involve communications with a WLAN typically cause multiple application streams to run on the application CPU. For example, a user may be sending uplink data and/or receiving downlink data in order to share media content, to download or stream video files, etc. As a result, in the case of video files, application streams may be started for launching each of a web browser, a download manager, a web player or media streaming application, etc. For each stream relating to WLAN, the application CPU is typically used to execute three software tasks—that is, the WLAN driver, the TCP/IP stack (or "IP stack"), and the application.

The existing kernel scheduler models for software tasks on the multi-core application CPU may seek to optimize power usage. However, such scheduling models may still be problematic from a power standpoint when handling WLAN related application streams. Specifically, to achieve a high throughput, the WLAN IP stack may have a relatively high processing requirement compared to the WLAN driver and application. Therefore, although the kernel scheduler may attempt to use the power cluster for the entire WLAN process, based on overall CPU loading and software tasks, the IP stack may need to be scheduled on the performance cluster.

Also based on the overall CPU loading and software tasks, the kernel may schedule the WLAN driver and IP stack tasks on a single core or multiple cores within the same cluster. While this flexibility helps reduce application CPU power usage in general, such help is only at a top layer. That is, the configuration and use of an application CPU cluster to run the WLAN IP stack is largely determined based on the WLAN driver software design and scheduling elements (also referred to as "WLAN subsystem"). For example, the WLAN subsystem may provide how the WLAN driver schedules work items, interfaces with the IP stack, and schedules the IP stack over multiple application streams. Such information is not exposed to or controlled by the kernel, and as a result power optimization from the kernel scheduler is typically very limited.

Some improvements to WLAN subsystem scheduling have been introduced for multi-core application CPUs in order to address workload and/or thermal issues. For example, depending on the particular throughput to be achieved, the frequency at which a single performance cluster core needs to run might exceed the maximum CPU clock. Therefore, receive packet steering (RPS) may be implemented by the kernel to distribute software tasks for handling received network packets across the available performance cluster cores to work in parallel. In this manner, IP stack tasks for different streams can be split onto multiple cores of the performance cluster. Each of these performance cluster cores has a reduced workload and runs at an average lower core frequency compared to the single core.

However, while employing RPS may have a slight effect on power usage by avoiding running a performance core at a very high clock rate, it is not directed by power concerns. That is, the RPS function does not take into account the power characteristics of the application CPU cores. Rather, RPS is largely driven by throughput demand by processing tasks in parallel.

A technique that has been used to reduce power consumption by tasks (e.g., IP stack software) running on the performance cores of an application CPU is to fix the WLAN driver to the IP stack that is part of the same application stream. In this manner, the additional processing that is required in order to coordinate between these two tasks is avoided. However, to achieve high throughput, the WLAN driver and IP stack for each application stream are allocated together to a performance cluster core.

In various embodiments, the WLAN subsystem may implement a power optimized task scheduling process that is tailored to the application CPU power cores on a computing device. In particular, the power optimized task scheduling process may be designed for the IP stack and WLAN driver software, which ultimately determines a large portion of the aCPU power consumption. The WLAN subsystem may ultimately minimize power consumption on an application CPU based on thresholds defined by particular power profiles of the cores.

Specifically, a performance curve (i.e., power profile) may be developed for a core (for example, of the power cluster) of the multi-core application CPU for use in the scheduling in various embodiments. In particular, various power ranges and thresholds may be computed in order to develop a scheduling process that is specific to the application CPU hardware.

With regards to the diverse performance characteristics of various processors/cores that may be included in a heterogeneous processing component, performance differences may be attributable to any number of reasons including, but not limited to, differing levels of silicon, design variations, etc. The performance characteristics associated with any given processing component may vary in relation with the operating temperature of that processing component, the power supplied to that processing component, etc.

Figure 4A:
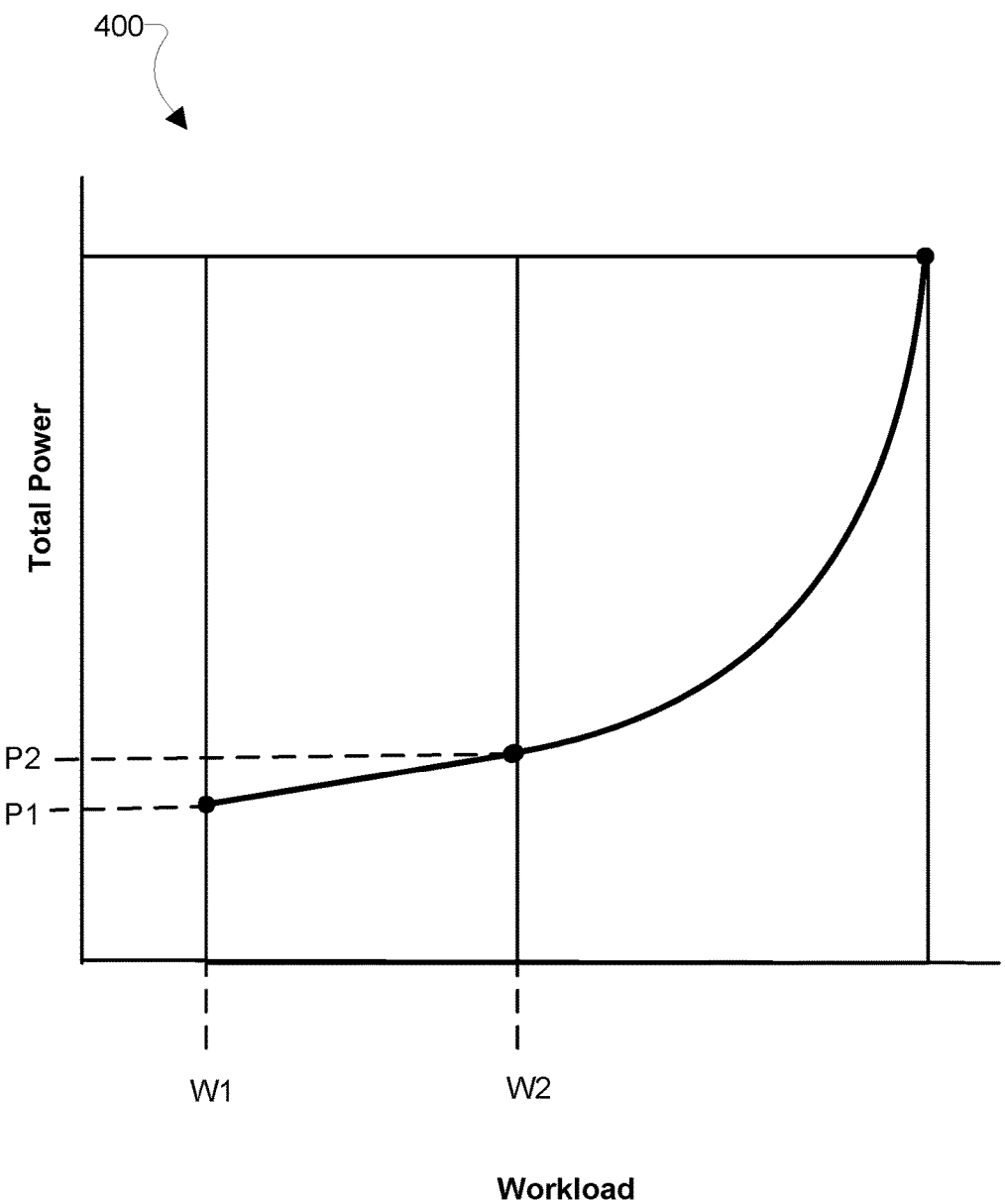
FIG. 4A is a graph illustrating a power profile curve for a representative core of power cluster in an application processor.

FIG. 4A shows a graph 400 illustrating a power profile of an example power cluster core of an application CPU. The power profile shown in graph 400 is a representative performance curve depicting power consumed as a function of workload for the power cluster core. The power profile may be used to develop algorithms for use in scheduling by the WLAN subsystem.

In various embodiments, workload may be expressed, for example, in DMIPS, from which a corresponding WLAN throughput may be calculated. As shown in the graph 400, a first workload threshold "W1" corresponds to a baseline power consumption level for the operating the power cluster core. That is, reducing the WLAN throughput to lower than the value corresponding to W1 does not lead to any reduction in power consumption. The baseline power consumption level may be referred to as the first power threshold "P2."

Between workload threshold W1 and a second workload threshold "W2," the performance curve of the representative power cluster core is substantially linear. That is, the additional power consumption resulting from each incremental workload increase is approximately constant. As such, no power savings would be realized from scheduling the same tasks on separate power cluster cores since the power consumed by two such cores each at a lower core frequency would be approximately the same as the power consumed by the single power cluster core at the total frequency. The power consumption at the workload threshold W2 may be referred to as a second power threshold "P2."

Above workload threshold W2, however, the performance curve of the representative power cluster core shows that the processing efficiency decreases with an increase in workload. That is, the added power consumption is greater for each additional DMIPS above W2. As such, when the requested WLAN throughput corresponds to a workload above the workload threshold W2, there is a power savings from dividing the tasks between multiple cores with each core running at an average lower operating frequency. In particular, the corresponding reduction in workload provides a proportionately larger decrease in power consumption, and is therefore a power advantage.

In various embodiments, threshold WLAN throughput values corresponding to the workload thresholds W1 and W2 may be used to provide instructions to the WLAN subsystem for how to schedule the IP stack and/or WLAN driver software for multiple application streams.

Embodiments are described as having a performance curve in which two workload thresholds (i.e., W1 and W2) demarcate three distinct regions of a power profile. However, such thresholds are provided merely as an example with respect to a representative application CPU. As will be appreciated by one of skill in the art, a particular application CPU may have a performance curve characterized by any number of power profile regions, which may be defined by greater or fewer than two workload thresholds.

Figure 4B:
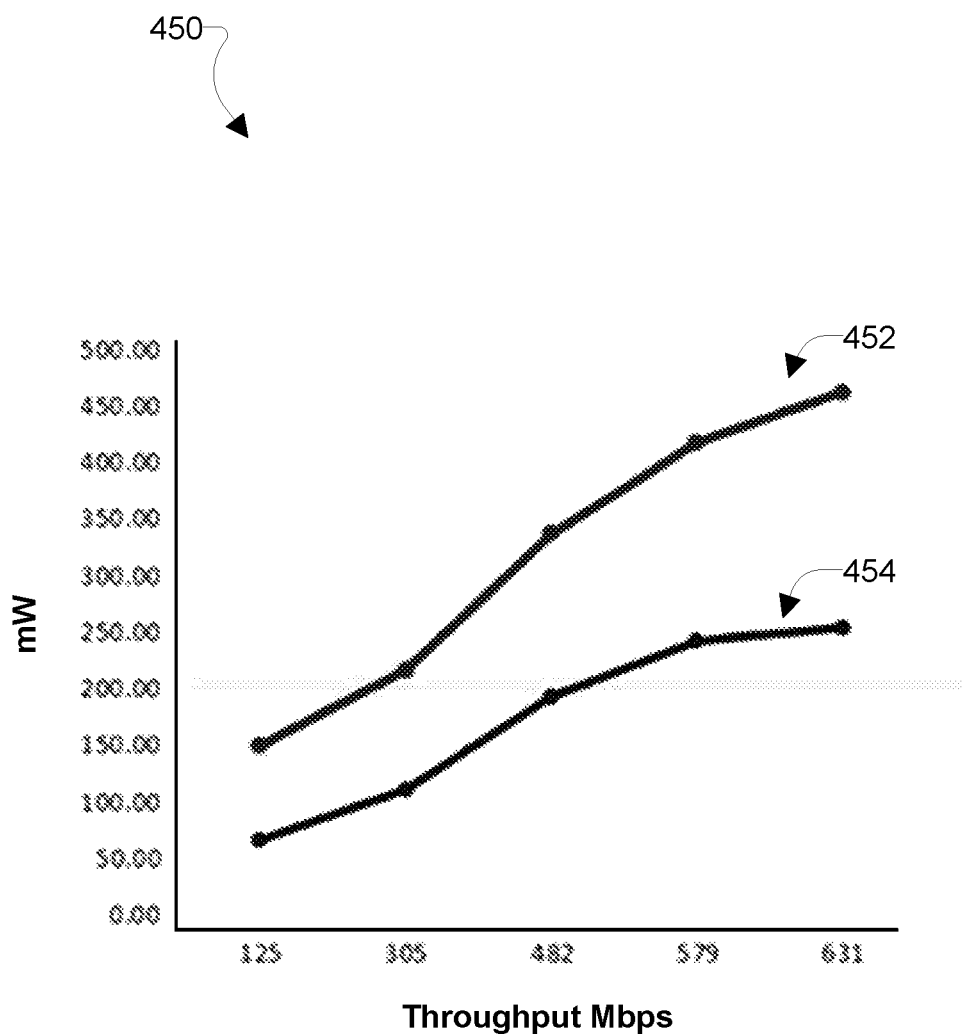
FIG. 4B is a graph illustrating an estimated improvement in power consumption for an example application processor according to various embodiments.

FIG. 4B shows a graph 450 illustrating estimated improvements to power consumption by an application CPU implementing an embodiment power optimized task scheduling process.

Specifically, the graph 450 illustrates measurements reflecting the power consumption as a function of throughput on a Qualcomm® Snapdragon™ 835 (MSM8998). A baseline data set 452 shows power consumption of the MSM8998 using normal task handling while two application streams are running.

A second data set 454 shows power consumption of the MSM89998 implementing power optimized task scheduling described herein while running the two application streams. As illustrated, the second data set 454 reflects a significant decrease in power consumption compared to the baseline data set 452.

Figure 5A:
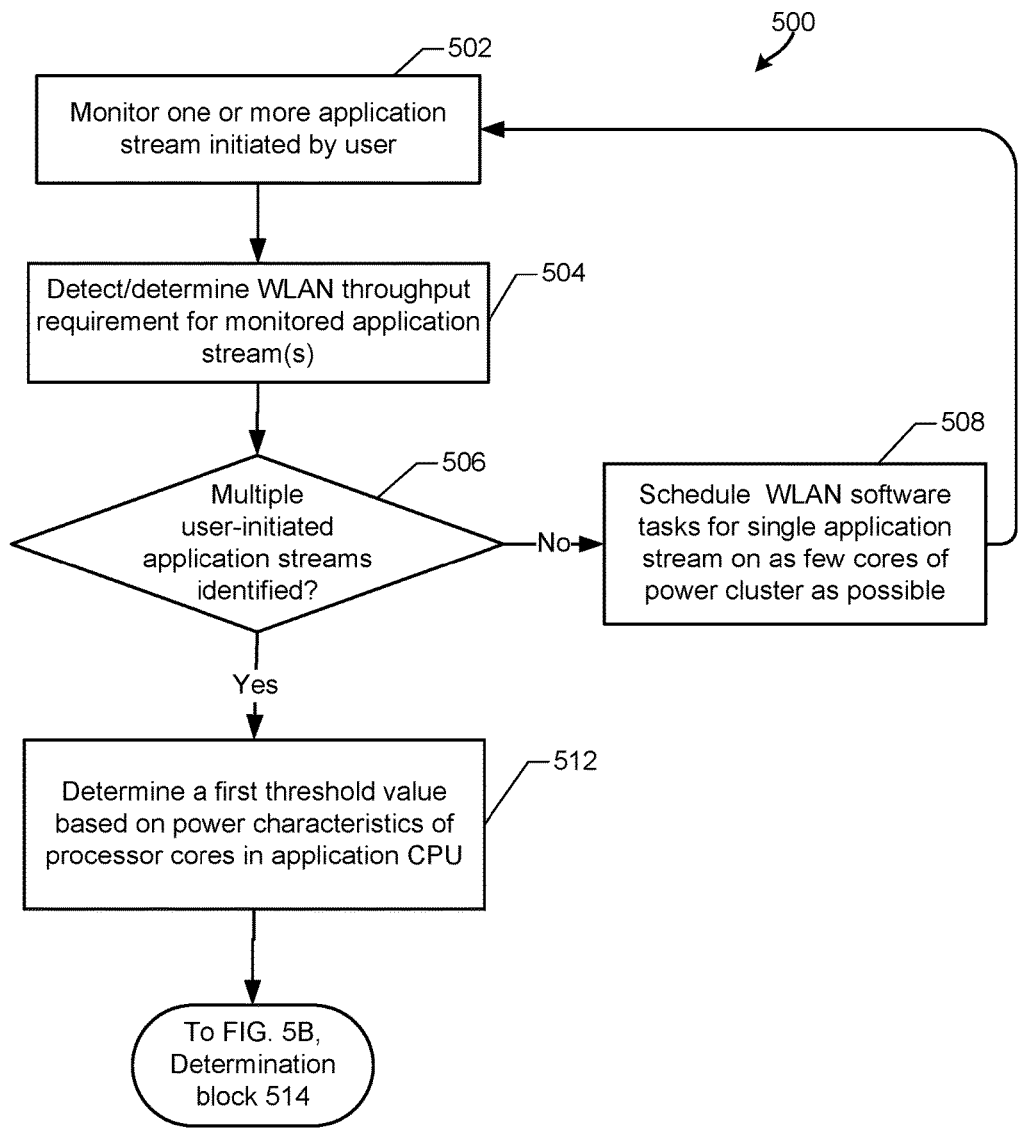
FIGS. 5A and 5B are process flow diagrams illustrating a method for scheduling tasks on low-power processor cores in various embodiments.
Figure 5B:
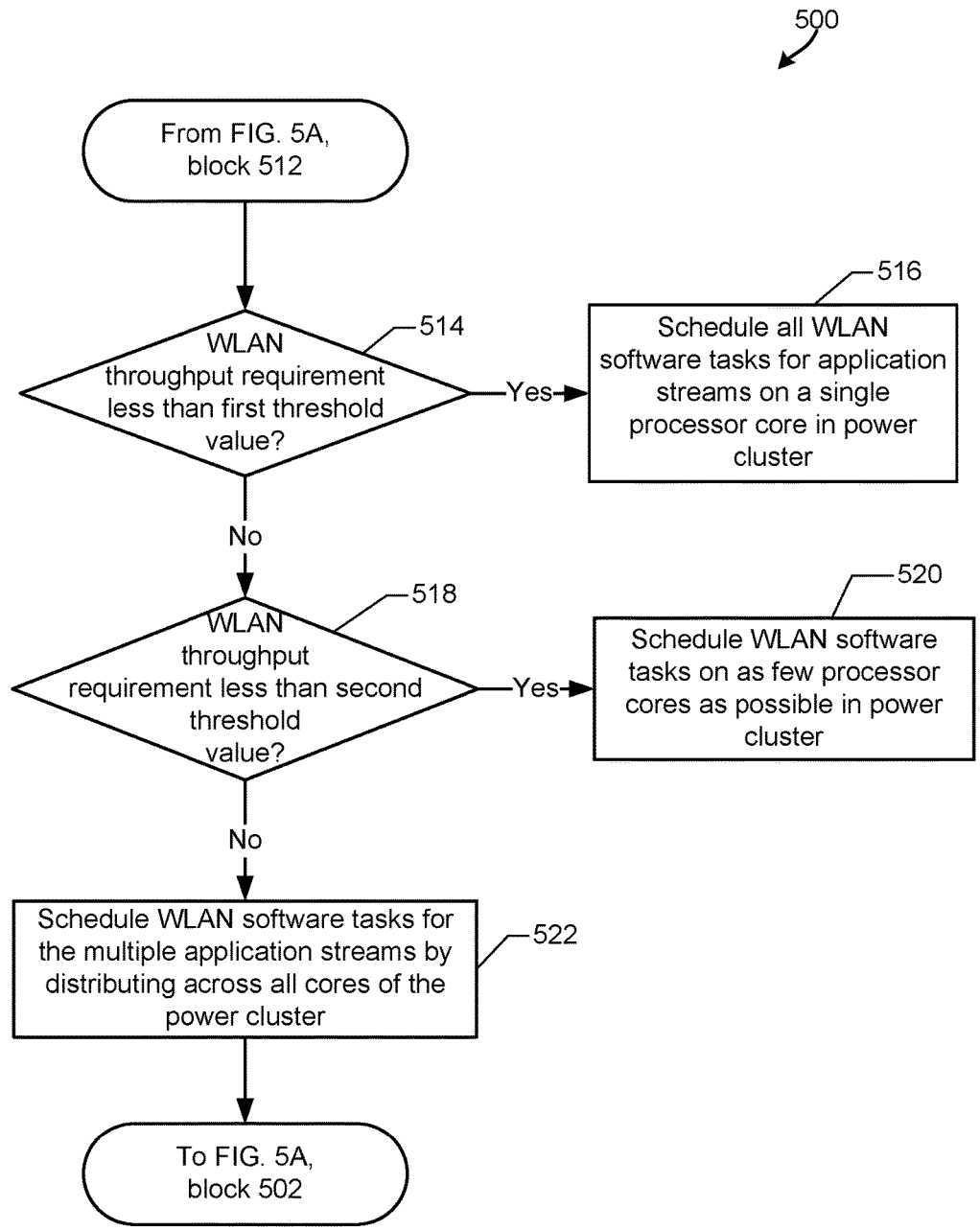

FIGS. 5A and 5B illustrate a method 500 of scheduling WLAN software tasks using power characteristics of processor cores configured in a multi-core application CPU. According to various embodiments, methods for dynamically scheduling WLAN software related tasks using present power characteristics of processor cores may be implemented in a multi-core application CPU. Such systems may provide flexibility for parallel scheduling of processing-intense software tasks onto power cores. In particular, a pre-defined set of information about the application CPU hardware power characteristics enables such flexibility and distributed processing.

In various embodiments, the WLAN subsystem may minimize power consumption on the application CPU by avoiding scheduling tasks on the performance cluster. For example, if there is a high processing demand due to application streams on the application CPU, the WLAN subsystem may spread the tasks of such streams across multiple cores, thereby reducing the required frequency and enabling the tasks to be performed by cores of the power cluster. In some embodiments, the WLAN subsystem may provide scheduling for the IP stack, and optionally the WLAN driver, for each of multiple application streams.

With reference to FIGS. 1-5B, the operations of the method 500 may be implemented in a computing device in software, executing in a processor, for example, the processor 14, in general purpose hardware, in dedicated hardware, or in a combination of a processor and dedicated hardware, such as a processor executing a WLAN subsystem that includes other individual components. In order to encompass the alternative configurations enabled in the various embodiments, the hardware implementing the method 500 is referred to herein as a "processing device."

In block 502, the processing device may monitor one or more application stream initiated by the user on the computing device.

In block 504, the processing device may detect the WLAN throughput requirement for the monitored application stream(s) in block 506. In some embodiments, detecting or determining the WLAN throughput requirement may be performed by computing the throughput based on executing application(s). In some embodiments, detecting or determining the WLAN throughput requirement may be performed by reading back the application CPU and/or bus registers.

In determination block 506, the processing device may determine whether multiple user-initiated application streams are identified.

In response to determining that multiple user-initiated application streams are not identified (i.e., determination block 506="No"), the processing device may schedule the WLAN software tasks for the single application stream on as few power cluster cores as possible in block 508. For example, if permitted based on the capacity of processing cores in the assigned cluster and the WLAN throughput requirement, WLAN software tasks for the single stream (e.g., WLAN driver and IP stack) may be scheduled together on the same core. Otherwise, at least one additional core may be required for scheduling the WLAN software tasks (e.g., WLAN driver and IP stack), which may be assigned to different cores in the power cluster. The processing device may continue to monitor one or more application stream initiated by the user in block 502.

In response to determining that multiple user-initiated application streams are identified (i.e., determination block 506="Yes"), the processing device may determine (e.g., calculate) a first threshold value based on the power characteristics of processor cores in an application CPU in block 512. In some embodiments, the first threshold value may be determined or calculated using a power profile of the multi-core application CPU in the computing device. For example, a performance curve such as shown in the graph 400 (FIG. 4) may be calibrated for the particular cores and clusters of the application CPU. Once a value of the first workload threshold (e.g., W1) is identified, the processing device may identify the first power threshold (e.g., P1) using the performance curve. A first threshold value may be determined by calibrating a WLAN throughput corresponding to the first workload threshold based on the particular application CPU hardware and WLAN software design.

In determination block 514 (FIG. 5B), the processing device may determine whether the WLAN throughput requirement is less than the first threshold value. In response to determining that the WLAN throughput requirement is less than the first threshold value.

In response to determining that the WLAN throughput requirement is less than the first threshold value (i.e., determination block 514="Yes"), the processing device may schedule all of the WLAN software tasks (e.g., IP stack and WLAN driver) for the multiple application streams on a single processor core in the power cluster of the application CPU in block 516.

In response to determining that the WLAN throughput requirement is not less than the first threshold value (i.e., determination block 514="No"), the processing device may determine whether the WLAN throughput requirement is less than a second workload threshold value in determination block 518. In some embodiments, the second threshold may be calculated using the power profile of the multi-core application CPU in the computing device, as described with reference to graph 400 (FIG. 4). Once a value is identified for W2, the processing device may obtain the second threshold value as a corresponding WLAN throughput in view of the processor core configurations.

In response to determining that the WLAN throughput requirement is less than the second threshold value (i.e., determination block 518="Yes"), in block 520, the processing device may schedule the WLAN software tasks (e.g., IP stack and WLAN driver) for the multiple application streams on as few processor cores as possible in the power cluster. In some embodiments, all WLAN software tasks may be schedule on a single processor core. In some embodiments, based on the capacity of processing cores in the power cluster and the application CPU loading, at least one additional core may be required for scheduling the WLAN software tasks. In some embodiments, the IP stack and WLAN driver of a particular application stream may be scheduled together, while in some embodiments these tasks may be assigned to different cores.

In response to determining that the WLAN throughput requirement is not less than the second threshold value (i.e., determination block 518="No"), the processing device may schedule the WLAN software tasks (e.g., IP stack and WLAN driver) for the multiple application streams by distributing across all cores of the power cluster in block 522. The processing device may continue monitoring one or more application stream initiated by the user in block 502.

Figure 6:
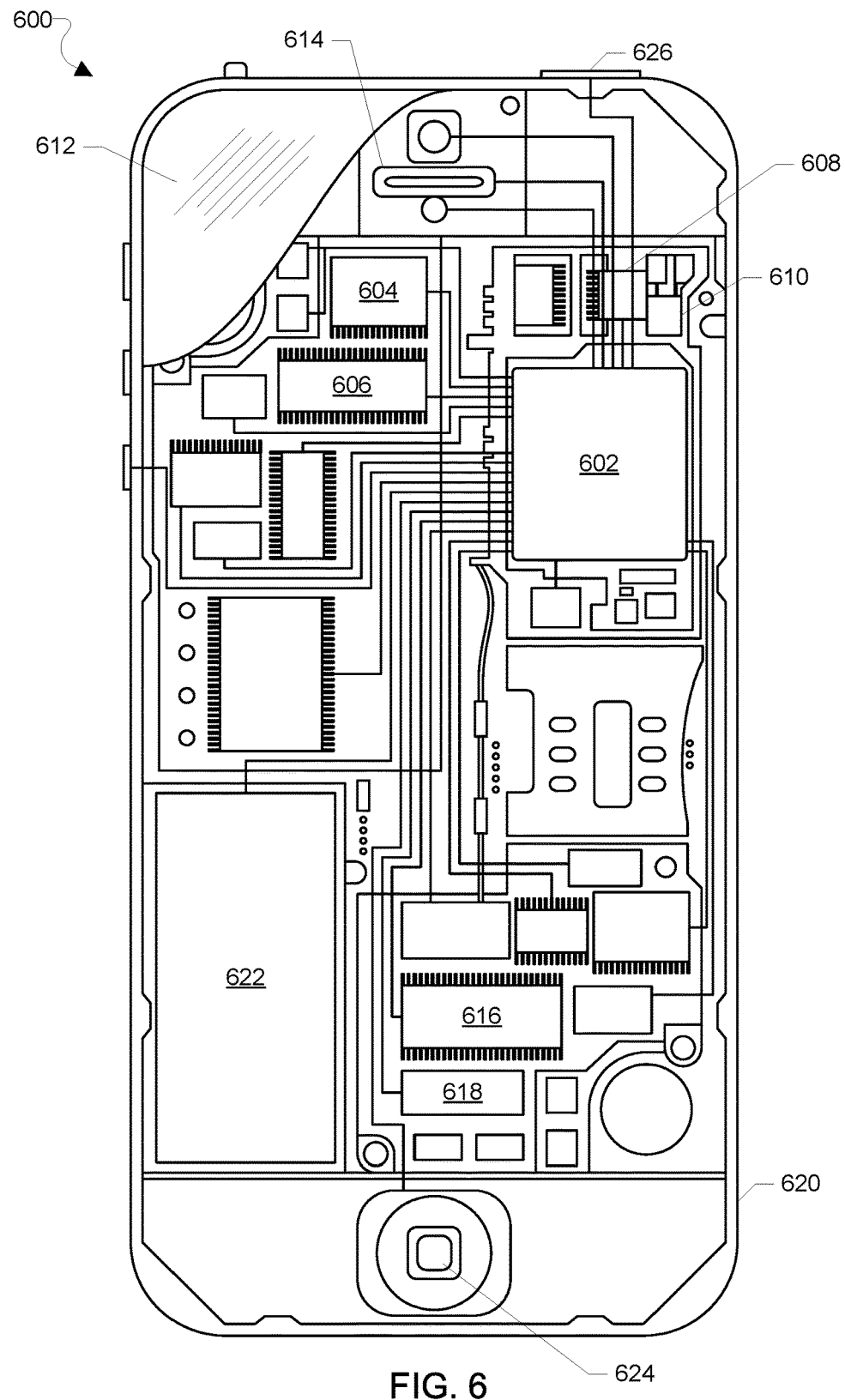
FIG. 6 is component block diagram illustrating an example mobile computing device suitable for use with the various embodiments.

The various embodiments (including, but not limited to, embodiments described above with reference to FIGS. 1-5B) may be implemented in a wide variety of computing systems including mobile computing devices, an example of which suitable for use with the various embodiments is illustrated in FIG. 6. The mobile computing device 600 may include a processor 602 coupled to a touchscreen controller 604 and an internal memory 606. The processor 602 may be one or more multicore integrated circuits designated for general or specific processing tasks. The internal memory 606 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the computing device 600 need not have touch screen capability.

The mobile computing device 600 may have one or more radio signal transceivers 608 (e.g., Peanut, Bluetooth, Zigbee, Wi-Fi, RF radio) and antennae 610, for sending and receiving communications, coupled to each other and/or to the processor 602. The transceivers 608 and antennae 610 may be used with the above-mentioned circuitry to implement the various wireless transmission protocol stacks and interfaces. The mobile computing device 600 may include a cellular network wireless modem chip 616 that enables communication via a cellular network and is coupled to the processor.

The mobile computing device 600 may include a peripheral device connection interface 618 coupled to the processor 602. The peripheral device connection interface 618 may be singularly configured to accept one type of connection, or may be configured to accept various types of physical and communication connections, common or proprietary, such as Universal Serial Bus (USB), FireWire, Thunderbolt, or PCIe. The peripheral device connection interface 618 may also be coupled to a similarly configured peripheral device connection port (not shown).

The mobile computing device 600 may also include speakers 614 for providing audio outputs. The mobile computing device 600 may also include a housing 620, constructed of a plastic, metal, or a combination of materials, for containing all or some of the components described herein. The mobile computing device 600 may include a power source 622 coupled to the processor 602, such as a disposable or rechargeable battery. The rechargeable battery may also be coupled to the peripheral device connection port to receive a charging current from a source external to the mobile computing device 600. The mobile computing device 600 may also include a physical button 624 for receiving user inputs. The mobile computing device 600 may also include a power button 626 for turning the mobile computing device 600 on and off.

Figure 7:
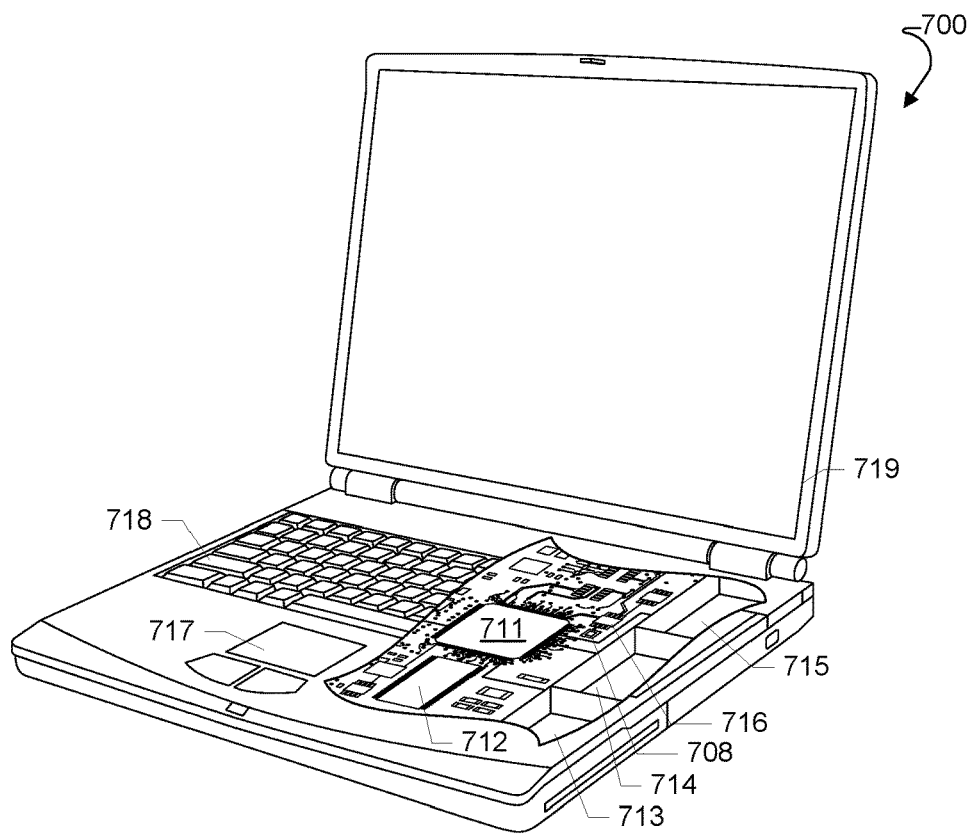
FIG. 7 is component block diagram illustrating an example mobile computing device suitable for use with the various embodiments.

The various embodiments (including, but not limited to, embodiments described above with reference to FIGS. 1-5B) may be implemented in a wide variety of computing systems include a laptop computer 700 an example of which is illustrated in FIG. 7. Many laptop computers include a touchpad touch surface 717 that serves as the computer's pointing device, and thus may receive drag, scroll, and flick gestures similar to those implemented on computing devices equipped with a touch screen display and described above. A laptop computer 700 will typically include a processor 711 coupled to volatile memory 712 and a large capacity non-volatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 711. The computer 700 may also include a floppy disc drive 714 and a compact disc (CD) drive 715 coupled to the processor 711. In a notebook configuration, the computer housing includes the touchpad 717, the keyboard 718, and the display 719 all coupled to the processor 711. Other configurations of the computing device may include a computer mouse or trackball coupled to the processor (e.g., via a USB input) as are well known, which may also be used in conjunction with the various embodiments.

Figure 8:
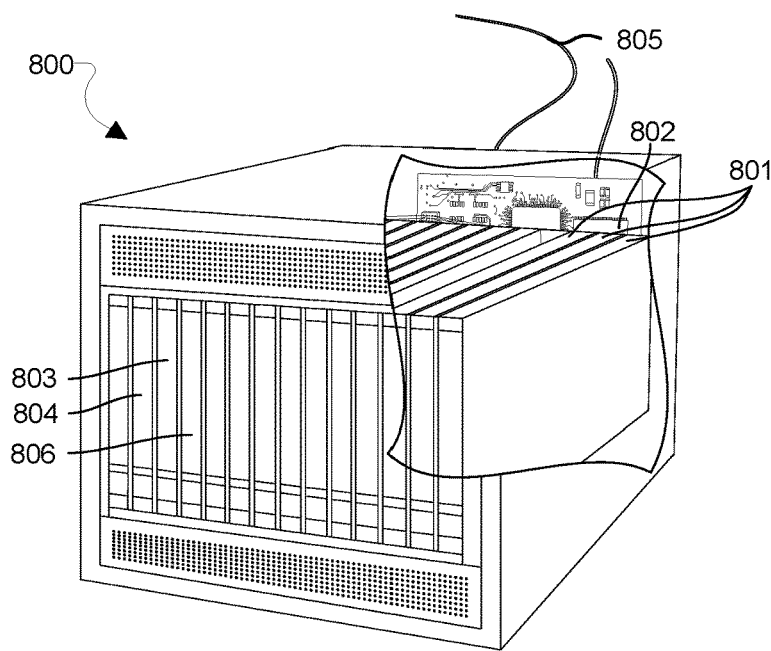
FIG. 8 is component block diagram illustrating an example server suitable for use with the various embodiments.

The various embodiments (including, but not limited to, embodiments described above—to FIGS. 1-10) may also be implemented in fixed computing systems, such as any of a variety of commercially available servers. An example server 800 is illustrated in FIG. 8. Such a server 800 typically includes one or more multi-core processor assemblies 801 coupled to volatile memory 802 and a large capacity nonvolatile memory, such as a disk drive 804. As illustrated in FIG. 8, multi-core processor assemblies 801 may be added to the server 800 by inserting them into the racks of the assembly. The server 800 may also include a floppy disc drive, compact disc (CD) or digital versatile disc (DVD) disc drive 806 coupled to the processor 801. The server 800 may also include network access ports 803 coupled to the multi-core processor assemblies 801 for establishing network interface connections with a network 805, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular. The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of scheduling processing tasks in a computing device having a group of low-power processor cores and other processor cores, the method comprising:
   identifying multiple application streams related to communication with a wireless local area network (WLAN);
   computing a total WLAN throughput requirement for the multiple application streams;
   determining whether the total WLAN throughput requirement is less than a first threshold value, wherein the first threshold value is based on power characteristics of the low-power processor cores; and
   in response to determining that the total WLAN throughput requirement is not less than the first threshold value:
      determining whether the total WLAN throughput requirement is less than a second threshold value, wherein the second threshold value corresponds to a change in a power profile curve measuring power consumption as a function of workload for the low-power processor cores; and
      scheduling processing tasks for the multiple application streams by distributing the tasks across all of the low-power processor cores in response to determining that the total WLAN throughput requirement is not less than the second threshold value.

2. The method of claim 1, further comprising scheduling all processing tasks for the multiple application streams on at least one of the low-power processor cores in response to determining that the total WLAN throughput requirement is less than the second threshold value.

3. The method of claim 1, further comprising scheduling all processing tasks for the multiple application streams on one of the low-power processor cores in response to determining that the total WLAN throughput requirement is less than the first threshold value.

4. The method of claim 1, wherein distributing the tasks across all of the low-power processor cores reduces an average frequency among the low-power processor cores, wherein reducing the average frequency among the low-power processor cores provides a power advantage based on a slower rate of increase in performance than power consumption.

5. The method of claim 1, wherein the processing tasks for the multiple application streams comprise at least WLAN driver software and internet protocol (IP) stack software.

6. The method of claim 1, wherein a performance core is turned off during the scheduling.

7. A computing device, comprising:
   a processing device having a group of low-power processor cores and at least one high-performance processor core, wherein the processing device is configured with processor-executable instructions to:
      identify multiple application streams related to communication with a wireless local area network (WLAN);
      compute a total WLAN throughput requirement for the multiple application streams;
      determine whether the total WLAN throughput requirement is less than a first threshold value, wherein the first threshold value is based on power characteristics of the low-power processor cores; and
      in response to determining that the total WLAN throughput requirement is not less than the first threshold value:
         determine whether the total WLAN throughput requirement is less than a second threshold value, wherein the second threshold value corresponds to a change in a power profile curve measuring power consumption as a function of workload for the low-power processor cores; and
         schedule processing tasks for the multiple application streams by distributing the tasks across all of the low-power processor cores in response to determining that the total WLAN throughput requirement is not less than the second threshold value.

8. The computing device of claim 7, wherein the processing device is further configured with processor-executable instructions to schedule all processing tasks for the multiple application streams on at least one of the low-power processor cores in response to determining that the total WLAN throughput requirement is less than the second threshold value.

9. The computing device of claim 7, wherein the processing device is further configured with processor-executable instructions to schedule processing tasks for the multiple application streams on one of the low-power processor cores in response to determining that the total WLAN throughput requirement is less than the first threshold value.

10. The computing device of claim 7, wherein distributing the tasks across all of the low-power processor cores reduces an average frequency among the low-power processor cores, wherein reducing the average frequency among the low-power processor cores provides a power advantage based on a slower rate of increase in performance than power consumption.

11. The computing device of claim 7, wherein the processing tasks for the multiple application streams comprise at least WLAN driver software and internet protocol (IP) stack software.

12. The computing device of claim 7, wherein a performance core is turned off during the scheduling.

13. A computing device, comprising:
a group of low-power processor cores and at least one high-performance processor core;
means for identifying multiple application streams related to communication with a wireless local area network (WLAN);
means for computing a total WLAN throughput requirement for the multiple application streams;
means for determining whether the total WLAN throughput requirement is less than a first threshold value, wherein the first threshold value is based on power characteristics of the low-power processor cores;
means for determining whether the total WLAN throughput requirement is less than a second threshold value in response to determining that the total WLAN throughput requirement is not less than the first threshold value, wherein the second threshold value corresponds to a change in a power profile curve measuring power consumption as a function of workload for the low-power processor cores; and
means for scheduling processing tasks for the multiple application streams by distributing the processing tasks across all of the low-power processor cores in response to determining that the total WLAN throughput requirement is not less than the second threshold value.

14. The computing device of claim 13, further comprising means for scheduling all processing tasks for the multiple application streams on at least one of the low-power processor cores in response to determining that the total WLAN throughput requirement is less than the second threshold value.

15. The computing device of claim 13, further comprising means for scheduling all processing tasks for the multiple application streams on one of the low-power processor cores in response to determining that the total WLAN throughput requirement is less than the first threshold value.

16. The computing device of claim 13, distributing the processing tasks across all of the low-power processor cores reduces an average frequency among the low-power processor cores, wherein reducing the average frequency among the low-power processor cores provides a power advantage based on a slower rate of increase in performance than power consumption.

17. The computing device of claim 13, wherein the processing tasks for the multiple application streams comprise at least WLAN driver software and internet protocol (IP) stack software.

18. The computing device of claim 13, wherein a performance core is turned off during the scheduling.

19. A non-transitory processor-readable storage medium having stored thereon processor-executable instructions configured to cause a processing device having a group of low-power processor cores and at least one high-performance processor core to perform operations comprising:
identifying multiple application streams related to communication with a wireless local area network (WLAN);
computing a total WLAN throughput requirement for the multiple application streams;
determining whether the total WLAN throughput requirement is less than a first threshold value, wherein the first threshold value is based on power characteristics of the low-power processor cores; and
in response to determining that the total WLAN throughput requirement is not less than the first threshold value:
determining whether the total WLAN throughput requirement is less than a second threshold value, wherein the second threshold value corresponds to a change in a power profile curve measuring power consumption as a function of workload for the low-power processor cores; and
scheduling processing tasks for the multiple application streams by distributing the tasks across all of the low-power processor cores in response to determining that the total WLAN throughput requirement is not less than the second threshold value.

20. The non-transitory processor-readable storage medium of claim 19, wherein the stored processor-executable instructions are configured to cause the processing device to perform operations further comprising scheduling all processing tasks for the multiple application streams on at least one of the low-power processor cores in response to determining that the total WLAN throughput requirement is less than the second threshold value.

21. The non-transitory processor-readable storage medium of claim 19, wherein the stored processor-executable instructions are configured to cause the processing device to perform operations further comprising scheduling all processing tasks for the multiple application streams on one of the low-power processor cores in response to determining that the total WLAN throughput requirement is less than the first threshold value.

22. The non-transitory processor-readable storage medium of claim 19, wherein the stored processor-executable instructions are configured to cause the processing device to perform operations such that distributing the tasks across all of the low-power processor cores reduces an average frequency among the low-power processor cores, wherein reducing the average frequency among the low-power processor cores provides a power advantage based on a slower rate of increase in performance than power consumption.

23. The non-transitory processor-readable storage medium of claim 19, wherein the processing tasks for the multiple application streams comprise at least WLAN driver software and internet protocol (IP) stack software.

24. The non-transitory processor-readable storage medium of claim 19, wherein a performance core is turned off during the scheduling.

* * * * *